INVENTORS
H. DON BURKHALTER
ERNEST J. RUSSELL

BY Burns, Doane, Benedict, Swecker & Mathis
ATTORNEYS 3,460,288
TREE HARVESTING METHOD
Harvey Don Burkhalter and Ernest J. Russell, Ruston, La., assignors to T. L. James & Company, Inc., Ruston, La., a corporation of Louisiana
Filed Apr. 25, 1967, Ser. No. 633,536
Int. Cl. A01g 23/00; G01n 25/56, 5/02
U.S. Cl. 47—58                                   7 Claims

ABSTRACT OF THE DISCLOSURE

A method of harvesting standing trees wherein the tree is felled and is dried for an interval of time while the crown is maintained intact on the stem. The optimum interval of drying time is established by utilization of an electric moisture meter to periodically indicate moisture content of the felled tree. When the moisture content of the felled tree ceases to be reduced, or starts to increase, as indicated by the meter, and in spite of continued weight reduction of the tree, the need for completion of harvesting is indicated if tree deterioration is to be circumvented.

FIELD OF THE INVENTION

This invention relates to tree harvesting and, more specifically, to a commercial method of harvesting trees to achieve a natural reduction of the moisture content of the wood product.

Heretofore it has been the practice in commercial tree harvesting, such as in the production of pulp wood, poles, piling, or saw logs, to cut or fell a standing tree to be harvested and, at the same time, to remove the unmerchantable tree crown or limbs. Subsequent to felling and topping, and to facilitate transportation to a mill, the severed, merchantable stem may be skidded to a staging area or bucked into mill lengths. These harvesting steps are usually integrated and completed in a relatively short interval of time to enhance labor efficiency and to circumvented harmful tree deterioration or rot, which may make the wood product unmerchantable. In some operations, such as production of poles, piling or lumber, the woodp roduct is heated and dried at the mill in kilns to meet production standards as to moisture content.

Regardless of the use to which the wood product is to be put, these and other more sophisticated or mechanized methods of tree harvesting have the common disadvantage that the wood product is transported to the mill while it has a high moisture content, and is therefore unduly heavy and prone to deterioration.

It is an object of the present invention to provide a tree harvesting method which naturally reduces wood product moisture content and weight, and circumvents certain wood product deterioration.

In achieving this general object, the present invention provides a tree harvesting method wherein, after felling a standing tree, the tree crown is maintained intact on the tree stem for an interval of time determined by moisture content and by deterioration considerations. In such a condition, the tree crown acts as a wick which sucks moisture from the stem, whereby not only is the drying the merchantable stem accelerated, but also the total naturally available drying effect is increased.

To understand the basis of the present invention, the anatomy and growth process of a tree should be considered. In the growth process of a tree, large amounts of water are drawn upwardly through the vascular system of a tree from the soil, through its roots and stem, to the leaves of its crown. Some of this water is required for growth of the tree, but a major portion is passed off into the atmosphere by the leaves through the process of transpiration. As is known, this upward drawing movement of water from the roots to the leaves is caused by root pressure and, to a greater extent, by the pull exerted by water evaporation on the leaves. As early as 1840 Boucherie determined that this drawing effect continued after a tree is severed from its stump and could be utilized to draw diverse liquids into the stem for various treatments. Accordingly, it has been theorized that leaving a crown of a felled tree on the stem for an interval of time after felling might enhance the drying process of a stem to a significant extent. In conducting field tests that resulted in the present invention, as will be discussed more fully hereinafter, it has been found that if a crown is severed from the merchantable stem immediately upon felling, as is the commercial practice, and if the stem is exposed to the atmosphere and permitted to dry for a period of time, the merchantable stem lost not more than about 6% of its weight. However, under identical conditions, if the crown is maintained intact on a stem of a felled tree and the severed tree is likewise permitted to dry for the same period of time, weight reductions of as much as 30% have been achieved. Clearly the benefits afforded by such reduction of weight are of major significance. Additionally, because the drying process of the stem is accelerated, the threat of tree deterioration, which appears to be greater at higher moisture contents, is retarded. However, field tests that resutled in the present invention established that both the maximum moisture content loss and weight reduction, as well as the interval of time necessary for achieving the same, varies greatly according to species and environmental conditions such as the season of the year, precipitation, humidity, and movement, and others. In some instances, it has been found that one month is sufficient to achieve the desired drying effect, while in other instances four months is necessary to fully achieve the benefits afforded by the present invention. Therefore, no standard or predictable drying period of time could be accurately established. If the interval of drying time is too short, no substantial weight reductions are achieved. More problematical is the fact that if the interval of drying time is too long, wood product deterioration may be encountered which results in making the wood product unmerchantable. These field tests establish that such deterioration commences after the tree has been dried for its optimum drying period, progresses rapidly thereafter and may, in a short length of time after commencement of deterioration, make the wood product unmerchantable. Of particular significance is the fact that the field tests forming the basis of the present invention establish that the felled tree continues to experience weight reductions as deterioration progresses. However, as will be more fully presented hereinafter, these field tests establish that prior to commencement of deterioration, the measured moisture content of the filled tree ceases to reduce, and in fact, peaks off and increases during the deterioration stage.

Thus, the present invention utilizes the basic transpiration process of a tree to provide a method of harvesting standing trees wherein a standing tree is felled and the felled tree is dried for an interval of time while the crown remains intact on the stem. Drying time is determined by periodically measuring the moisture content of the felled tree. According to the present invention, an electric moisture meter is utilized to periodically indicate the moisture content of the felled tree. At the time when the moisture content approaches its maximum reduction and fails to change, the need for severing the crown and further processing is indicated. It is particularly noteworthy that the present invention provides an indication of the need for completion of the tree harvesting process prior to the deterioration stage, in spite of the fact that further weight loss may be experienced during deterioration.

BRIEF DESCRIPTION OF THE DRAWINGS

In describing the invention, reference will be made to the accompanying drawings in which.

DETAILED DESCRIPTION OF THE INVENTION

Figure 1:
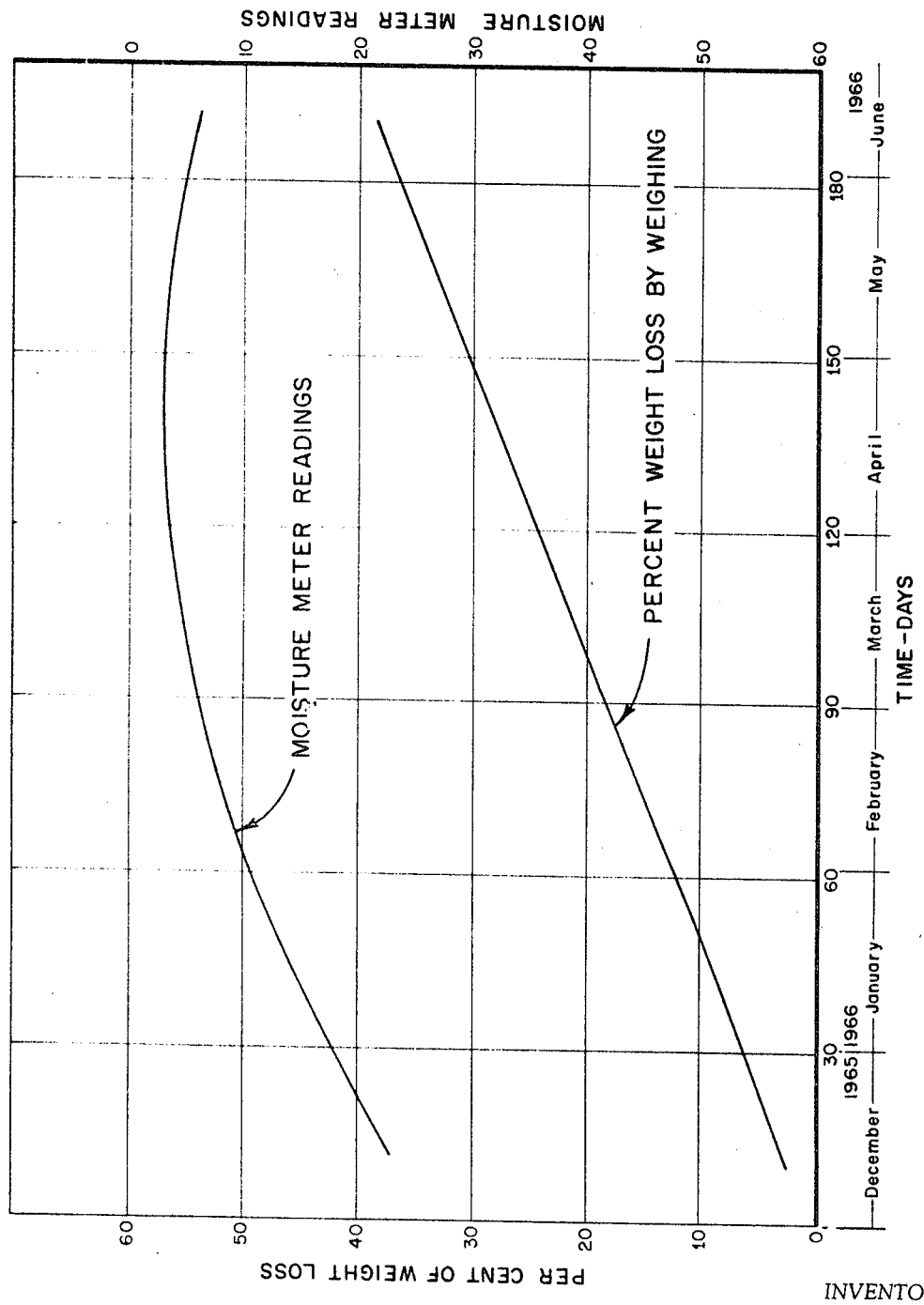
FIGURE 1 is a computerized graphic comparison of moisture meter readings of a test on loblolly pine and the average weight losses of six such trees harvested in accordance with the present invention.

The present method of harvesting trees utilizes the principle of transpiration and the physiological growth process of trees to naturally reduce the moisture content and weight of a tree after felling. Such is accomplished by maintaining the tree crown intact on the tree stem after felling and exposing the entire tree to atmosphere for an extended interval of time prior to further processing.

As has heretofore been discussed, in the tree growth process water is drawn from the soil, through the roots and stem, to the tree crown. This drawing action is generated, to a large extent, by water evaporation from the leaves of the crown as such water is passed off into the atmosphere through the process of transpiration. If a tree is severed from its roots and stump, a portion of the growth process continues for a period of time. However, since the supply of water afforded by the soil and roots is cut off, the leaves of the crown can only draw that water remaining in the stem. Thus, the desired drying action of the merchantable stem of the tree is provided.

That this transpiration drying action forming the basis of the present invention accelerates and extends wood product drying has been verified by extensive field tests on softwoods (Conifers) and hardwoods by the present inventors. Such field tests were conducted in all seasons of the year for loblolly pine (*Pinus taeda*) and slash pine (*Pinus elliotti*). In conducting these field tests, a large number of trees were cut and each entire tree, with its crown intact, was weighed immediately after felling by utilization of Fairbanks beam-type scales to establish green weight of the individual tree. These trees were exposed to the atmosphere and reweighed at regular intervals to measure weight loss.

To verify that tree drying was accelerated by maintaining the crown intact during the drying period, similar trees of the same species were felled at the same time and the merchantable stem severed from the crown. Each merchantable stem along was likewise weighed and reweighed in the same manner and at the same intervals as were the trees with the unsevered crowns.

TABLE A

Specie: Loblolly (entire tree), Tree No. A3-1
Age, 14 years; D.B.H., 7.2"
Merchantable length, 32'; crown length, 18'

| Date weighed | Days elapsed since last weighing | Weight (pounds) | Weight loss since last weighing (pounds) | Weight loss total (pounds) | Weight loss, percent, since last weighing | Total weight loss, percent |
|---|---|---|---|---|---|---|
| 6 May | Cut | 491 | | | | |
| 13 May | 7 | 432 | 59 | 59 | 12 | 12 |
| 20 May | 14 | 400 | 32 | 91 | 7 | 17 |
| 27 May | 21 | 358 | 42 | 133 | 10 | 27 |
| 4 June | 29 | 340 | 18 | 151 | 5 | 30.7 |
| 10 June | 35 | 335 | 5 | 156 | 1 | 31.77 |
| 17 June | 42 | 335 | | 156 | | 31.77 |

TABLE B

Specie: Loblolly (stem only), Tree No. A3-4

| Date weighed | Days elapsed since last weighing | Weight (pounds) | Weight loss total (pounds) | Total weight loss, percent |
|---|---|---|---|---|
| 7 May | Cut | 530 | | |
| 13 May | 6 | 525 | 5 | .8 |
| 20 May | 13 | 520 | 10 | 1.88 |
| 27 May | 20 | 517 | 13 | 2.45 |
| 4 June | 28 | 515 | 15 | 2.8 |
| 10 June | 34 | 512 | 18 | 3.5 |
| 17 June | 41 | 515 | 15 | 2.8 |

TABLE C

Specie: Slash (entire tree), Tree No. B4-2
Age, 19 years; D.B.H., 7.4
Merchantable length, 38'; crown length, 20'

| Date weighed | Days elapsed since last weighing | Weight (pounds) | Weight loss since last weighing (pounds) | Weight loss total (pounds) | Weight loss, percent, since last weighing | Total weight loss, percent |
|---|---|---|---|---|---|---|
| 6 July | Cut | 483 | | | | |
| 13 July | 7 | 430 | 53 | 53 | 10.97 | 10.97 |
| 20 July | 14 | 402 | 28 | 81 | 6.5 | 16.77 |
| 27 July | 21 | 356 | 46 | 127 | 11.44 | 26.29 |
| 3 August | 28 | 340 | 14 | 141 | 3.93 | 29.19 |

TABLE D

Specie: Slash (stem only), Tree No. B4-4

| Date weighed | Days elapsed since last weighing | Weight (pounds) | Weight loss total (pounds) | Total weight loss, percent |
|---|---|---|---|---|
| 6 July | Cut | 585 | | |
| 13 July | 7 | 581 | 4 | 1 |
| 20 July | 14 | 578 | 7 | 1 |
| 27 July | 21 | 570 | 15 | 2.56 |
| 3 August | 28 | 567 | 18 | 3 |

Many such tests were conducted but typical are the results of such tests on a pair of comparable loblolly pines, (tree numbers A3-1 and A3-4) as presented in Tables A and B, wherein weight losses for the entire tree, (unsevered crown) and stem alone (severed crown), respectively, are recorded. Tables C and D indicate the results of similar tests on a pair of comparable slash pines (tree numbers B4-2 and B4-4). As will be apparent from an inspection of Table A, tree number A3-1, which was dried for approximately one and one-half months with its crown intact, lost over 31% of its weight during the drying period. Tree number A3-4 of Table B from which the crown was severed from the stem immediately after felling experienced a mere 2.8% weight reduction in a like period of time. Similarly, as presented in Tables C and D, slash pine number B4-2, which was dried with its crown intact for a period of less than one month, experienced better than a 29% weight reduction as opposed to a 3% weight reduction of slash pine number B4-4, which was dried for the same interval of time with the crown severed from the stem.

Of the various field tests conducted on softwoods dried with the crowns intact, weight losses as high as 35% were achieved as opposed to weight losses of an average of around 3% for trees dried with the merchantable portion severed from the crown. Similar tests were conducted during the growth season for hardwoods, such as red oak (*Quercus falcata* Michx), white oak (*Quercus alba* L.), sweetgum (*Liquidambar styraciflua* L.), blackgum (*Nyssa sylvatica* Marsh), and hickory (*Carya tomentosa* Nutt). The results of these tests indicate that hardwoods dried with the crowns intact experienced weight losses as high as 28% as opposed to weight losses for drying the merchantable portion alone of a maximum of 8.8%.

To compare the effect of drying in both the severed and unservered conditions of the crown on weight loss of the merchantable portions alone, cord weight tests were conducted. Green and dried weights of a standard cord of 128 cubic feet were measured. These tests were conducted by felling a quantity of similar trees at the same time. Periodically, a number of trees of this group were topped, bucked and cord weight measured. The tree crowns were maintained intact during the drying period. In conducting these tests, volume determinations in cords were made in accordance with pulpwood industry practice, and the wood product was delivered and sold to a pulp mill. Net weights were determined by weighing a truck utilized for transporting to the pulp mill in both empty and loaded conditions by utilizing a portable Loadmaster type "A" scale similar to those used in checking truck weights by law enforcement agencies. The results of the cord weight tests on loblolly pine and slash pine are typified by the results presented in Table E and F below:

TABLE E

Specie: Loblolly (dried with crown), Test phase No. 3A

| Date weighed | Days elapsed since last weighing | Number of cords weighed (cords) | Weight per cord (pounds) | Weight loss per cord (pounds) | Total weight loss, percent |
|---|---|---|---|---|---|
| 5 May | Cut | 11.82 | 4,996 | | |
| 4 June | 30 | 6.15 | 4,166 | 830 | 16.61 |
| 8 June | 34 | 6.35 | 4,063 | 933 | 18.97 |

TABLE F

Specie: Slash (dried with crown), Test phase No. 4B

| Date weighed | Days elapsed since last weighing | Number of cords weighed (cords) | Weight per cord (pounds) | Weight loss per cord (pounds) | Total weight loss, percent |
|---|---|---|---|---|---|
| 6 July | Cut | 11.38 | 5,138 | | |
| 20 July | 14 | 6.25 | 4,312 | 826 | 16.07 |
| 21 July | 15 | 6.45 | 4,226 | 912 | 17.75 |

As will be apparent from a review of Table E, a cord of loblolly dried with its crown intact for a relatively short period of approximately one month experienced nearly 19% weight loss. Similarly, as presented in Table F, a cord of slash dried for a like period of time with its crown intact experienced a weight loss of approximately 18%.

It should be noted that the many field tests conducted indicate that the interval of drying required to achieve an optimum weight reduction varies greatly for a particular specie from season to season. Environmental conditions such as precipitation, humidity, wind movement, and the like which normally affect the growth process of a tree likewise affect drying time requirements. In some instances, as during warm, dry, summer periods, a drying time of approximately one month is adequate to achieve optimum weight loss. However, in other instances, as during winter months or slow tree growth periods, more than four months is required. In commercial practice it is necessary that optimum drying times be conveniently and reliably identified for efficiency reasons. But further, it is of the utmost importance that the harvesting process be completed prior to wood product deterioration or rot caused by fungi. Such deterioration, once commenced, progresses rapidly, particularly in the summer months and may, within a period of a few weeks, render a tree unmerchantable as the wood becomes soft or spongy. In this light, a drying period in which an entire felled tree is exposed to the atmosphere must be cut short prior to the deterioration stage and the harvesting process completed shortly thereafter. This problem is complicated by the following considerations: First, identification of the existence of such deterioration requires disection and inspection of a tree by a highly skilled technician. Further, it has been established in other field tests to be discussed hereinafter, that trees dried with the crown intact continue to experience weight reductions through the deterioration stage. Therefore, weight loss alone is not a reliable indication of the optimum time to complete harvesting to circumvent deterioration. However, it has also been established that prior to deterioration, moisture content of the wood product, as measured in a manner hereinafter discussed, ceases to reduce, and starts to increase. Therefore, by utilization of this concept, optimum drying time may be identified and deterioration circumvented.

To accurately identify the optimum drying time for felled trees dried with their crown intact, the present invention includes utilization of a battery-powered, hand-operated electric moisture meter, such as the Laucks "Sentry," which indicates the resistance to a flow of electricity through a subject composition. Electrical resistance varies in accordance with moisture content. Such meters include a conductive contact surface adapted to abut the outer periphery of a tree. Upon actuation, electricity is directed from a battery to the contact surface and composition, and a gage is provided which is calibrated to indicate resistance to a flow of electricity of the composition.

TABLE G

Specie: Loblolly (entire tree), Tree No. AM-1
Merchantable length, 31'; D.B.H., 8.2
Crown length, 24'

| Date weighed | Days elapsed since last weighing | Weight (pounds) | Weight loss since last weighing (pounds) | Weight loss total (pounds) | Weight loss, percent, since last weighing | Total weight loss, percent | Moisture meter reading |
|---|---|---|---|---|---|---|---|
| Dec. 2 | Cut | 510 | | | | | 25 |
| Dec. 9 | 7 | 489 | 21 | 21 | 4.11 | 4.11 | 23 |
| Dec. 17 | 15 | 492 | 3 | 18 | | 3.52 | 25 |
| Dec. 22 | 20 | 481 | 11 | 29 | 2.23 | 5.68 | 20 |
| Dec. 30 | 28 | 474 | 7 | 36 | 1.45 | 7.05 | 20 |
| Jan. 10 | 39 | 465 | 9 | 45 | 1.89 | 8.82 | 14 |
| Jan. 17 | 46 | 457 | 8 | 53 | 1.72 | 10.39 | 10 |
| Jan. 31 | 60 | 455 | 2 | 55 | .43 | 10.78 | 14 |
| Feb. 7 | 67 | 442 | 13 | 68 | 2.85 | 13.33 | 7 |
| Feb. 21 | 81 | 427 | 15 | 83 | 3.39 | 16.27 | 6 |
| Mar. 8 | 96 | 410 | 17 | 100 | 3.98 | 19.60 | 5 |
| Mar. 17 | 105 | 397 | 13 | 113 | 3.17 | 22.15 | 5 |
| Mar. 24 | 112 | 374 | 23 | 136 | 5.79 | 26.66 | 4 |
| Mar. 31 | 119 | 355 | 19 | 155 | 5.08 | 30.39 | 4 |
| Apr. 7 | 126 | 342 | 13 | 168 | 3.66 | 32.94 | 3 |
| Apr. 28 | 147 | 335 | 7 | 175 | 2.04 | 34.31 | 5 |
| May 6 | 155 | 334 | 1 | 176 | .23 | 34.50 | 6 |
| May 20 | 169 | 326 | 8 | 184 | 2.39 | 36.07 | 5 |
| May 30 | 179 | 310 | 16 | 200 | 4.90 | 39.21 | 5 |
| June 6 | 186 | 294 | 16 | 216 | 5.16 | 42.35 | 3 |

TABLE H

Specie: Slash (entire tree), Tree No. BM-1
Merchantable length, 27.6′; D.B.H., 7.4
Crown length, 22.9′

| Date weighed | Days elapsed since last weighing | Weight (pounds) | Weight loss since last weighing (pounds) | Weight loss total (pounds) | Weight loss, percent, since last weighing | Total weight loss, percent | Moisture meter reading |
|---|---|---|---|---|---|---|---|
| Dec. 2 | Cut | 432 | | | | | |
| Dec. 9 | 7 | 411 | 21 | 21 | 4.86 | 4.86 | 26 |
| Dec. 17 | 15 | 409 | 2 | 23 | .486 | 5.32 | 22 |
| Dec. 22 | 20 | 401 | 8 | 31 | 1.95 | 7.17 | 20 |
| Dec. 30 | 28 | 393 | 8 | 39 | 1.99 | 9.02 | 17 |
| Jan. 10 | 39 | 384 | 9 | 48 | 2.29 | 11.11 | 13 |
| Jan. 17 | 46 | 374 | 10 | 58 | 2.60 | 13.42 | 12 |
| Jan. 31 | 60 | 373 | 1 | 59 | .26 | 13.65 | 16 |
| Feb. 7 | 67 | 363 | 10 | 69 | 2.68 | 15.9 | 14 |
| Feb. 21 | 81 | 355 | 8 | 77 | 2.20 | 17.82 | 13 |
| Mar. 8 | 96 | 341 | 14 | 91 | 3.94 | 21.06 | 9 |
| Mar. 17 | 105 | 335 | 6 | 97 | 1.75 | 22.45 | 9 |
| Mar. 24 | 112 | 323 | 12 | 109 | 3.58 | 25.23 | 6 |
| Mar. 31 | 119 | 315 | 8 | 117 | 2.47 | 27.08 | 6 |
| Apr. 7 | 126 | 305 | 10 | 127 | 3.17 | 29.39 | 5 |
| Apr. 28 | 147 | 296 | 9 | 136 | 2.95 | 31.48 | 9 |
| May 6 | 155 | 296 | 0 | 136 | | 31.48 | 10 |
| May 20 | 169 | 293 | 3 | 139 | 1.01 | 32.17 | 9 |
| May 30 | 179 | 286 | 7 | 146 | 2.38 | 33.79 | 7 |
| June 6 | 186 | 280 | 6 | 152 | 2.09 | 35.18 | 4 |

In conducting these tests, a number of loblolly and slash pines were felled and exposed to the atmosphere for an extended period of time with their crowns intact. A Fairbanks beam-type scale was utilized to establish the green weight of the entire tree upon felling and to reweigh the entire tree at regular intervals similar to the method discussed in regard to Table A. At each reweighing, the moisture content of each tree was measured by utilization of a moisture meter. Typical of such tests are the results presented in Table G wherein weight losses and moisture meter readings for loblolly tree number AM-1, dried with its crown intact, are presented, as well as in Table H wherein similar information is presented for slash tree number BM-1.

At the time of felling the test trees, like trees were felled to serve as deterioration indicators. Individual trees of this latter group were dissected and inspected periodically during the drying period of the test trees to assure that the deterioration stage of the group cutting had not been reached. Deterioration was identified by visual observation and by penetration and cutting tests. In conducting such tests, a sharp knife was forced into various sections of the trees being tested, and the resistance to blade penetration was measured to determine whether cutting tests on an indicator tree should be made. Periodically throughout the tests or if the test tree appeared to be soft or spongy, the indicator trees were cut into sections while measuring resistance to cutting. Subsequent to cutting, cross sections of the indicator trees were visually inspected for evidence of deterioration. It is well known that deterioration occurs more quickly in those periods of the year when the tree growth process is accelerated. Advantageously, tree drying, according to the present invention, is also accelerated at these times.

As will be apparent from a review of Tables G and H, in a period of approximately four months, a minimum meter reading and a percentage weight loss of approximately 33% for loblolly and approximately 29% for slash were achieved. Subsequently, the recorded moisture meter reading commenced to peak-off and increase in spite of the fact that further weight losses were experienced. Such was the pattern in all trees tested. It has been established that deterioration of the test trees commenced at least one week after the moisture meter readings started to increase. All of the trees tested continued to lose weight throughout the deterioration stage and at the conclusion of the test period none of the trees was merchantable because of deterioration.

In all trees tested, such a peak-off of moisture meter readings prior to the deterioration stage was noted, in spite of the fact that further weight loss was experienced. It is theorized that an increase in moisture meter readings, coincident with a decrease in weight of the overall tree, results from the fact that in measuring moisture content, the moisture meter contacts the outer periphery of a test tree. It appears that just prior to deterioration, the outer periphery of a tree takes on moisture, as reflected by increased meter readings, while the inner portion of the tree continues to dry and becomes lighter as the crown continues to draw moisture therefrom.

In this light, utilization of a moisture meter to determine optimum drying time is not only beneficial because it conveniently indicates the extent of moisture loss experienced in the drying process, but also because it indicates the maximum drying period short of the critical limits established by deterioration. It is particularly noteworthy that the peak-off stage of moisture meter readings occurs a reasonable time before measurable deterioration commences, and therefore provides a cushion or grace period in which harvesting may be completed.

Figure 2:
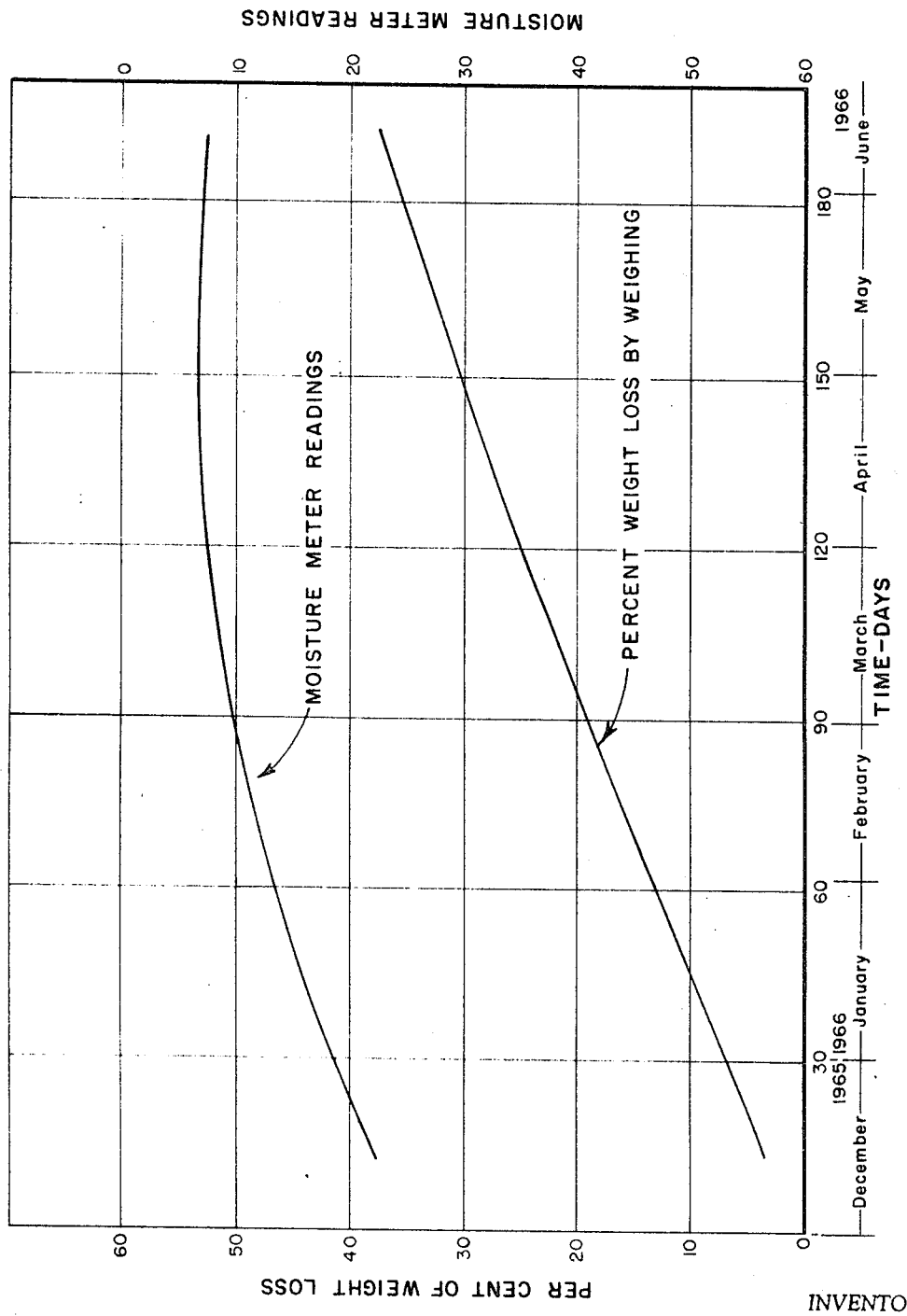
FIGURE 2 is a graphic comparison similar to that shown in FIGURE 1 but showing such test results for slash pine.

Referring to FIGURE 1, a graphic comparison of moisture meter readings for loblolly tree number AM-1 and average weight losses for a composite of six loblolly test trees (numbers AM-1-6) is presented. In each instance, a computer and recognized computer techniques were utilized to establish by quadratic regression analysis a smooth curve of the field test results based on computed standard deviation over exactly equal intervals of time. A similar graphic comparison for slash tree number BM-1 and composites BM-1-6 is presented in FIGURE 2. The correlation between moisture meter readings and weight loss during the optimum drying time is noteworthy.

The results of these field tests and analysis indicate that loblolly and slash pines in the test area in Louisiana should be dried with the crown intact until a weight reduction of the entire tree of from 28-35 is experienced. However, because the drying time to achieve such a weight reduction varies greatly dependent on ambient conditions, and because weight loss tests may not be feasible in a commercial operation, utilization of a moisture meter to determine weight loss affords a more reliable or convenient alternative. But still further, the advantages afforded by utilization of a moisture meter in practicing the present method of harvesting are magnified by the consideration that the peak-off stage of moisture meter readings provides a warning in advance of deterioration that the harvesting process should be completed.

By utilization of the present method of harvesting trees, it is commercially practical to accurately identify an optimum drying time for a group cutting by periodically measuring the moisture content of a single sample tree. Regardless of the calibration of a moisture meter, the pattern of moisture content reductions establishes critical limits short of deterioration. In spite of the fact that drying rates and total amounts might vary widely from area to area, specie to specie, and are dependent upon environmental conditions, the advantages afforded by the present invention are conveniently available.

In describing the present method of harvesting trees, reference has been made to but a single preferred embodiment of the present invention. It should be appreciated by one skilled in the art that various additions, deletions and modifications may be made which fall within the scope of the present invention which is to be ascertained by the following claims:

1. A method of harvesting standing trees comprising:
   felling a standing tree;
   exposing the felled tree with its crown intact to the atmosphere for an interval of time established by ascertaining the approximate moisture content reduction of the felled tree; and
   severing the tree crown prior to deterioration of the merchantable portion of the tree, the time of said severing being based upon the previously ascertained moisture content reduction.

2. A method of harvesting standing trees according to claim 1 wherein the moisture content reduction of the felled tree is established by measuring the resistance to flow of electricity through the tree.

3. A method of harvesting standing trees according to claim 2 wherein resistance to flow of electricity is periodically measured and wherein the crown is severed shortly after the resistance ceases to diminish, before the resistance substantially increases but while the tree continues to experience a reduction in weight.

4. A method of harvesting standing trees according to claim 2 wherein a group of trees are substantially concurrently felled and the moisture content reduction thereof is ascertained by measuring the moisture content of only certain of the trees.

5. A method of harvesting standing conifers comprising:
   felling a standing conifer;
   exposing the felled conifer with its crown intact to the atmosphere for an interval of time established by ascertaining the approximate moisture content reduction of the felled conifer and for an interval of time required to achieve at least a 28 percent weight loss of the conifer; and
   severing the crown prior to deterioration of the merchantable portion of the conifer, the time of said severing being based upon the previously ascertained moisture content reduction.

6. A method of harvesting standing conifers according to claim 5 further including testing the trees' resistance to penetration prior to severing the crown.

7. A method of harvesting conifers during the winter and summer months, said method comprising:
   felling a first group of conifers during the winter months;
   felling a second group of conifers during the summer months;
   exposing to the atmosphere the conifers of the first group, each with its crown intact, for a first interval of time established by ascertaining the approximate moisture content reduction of at least certain of the first group;
   exposing to the atmosphere the conifers of the second group, each with its crown intact, for a second interval of time established by ascertaining the approximate moisture content reduction of at least certain of the second group, said second interval of time being substantially shorter than said first interval; and
   severing the crowns prior to deterioration of the merchantable portion of the conifers, the times of said severing being based upon the previously ascertained moisture content reductions.

References Cited

UNITED STATES PATENTS 2,505,778   5/1950   Limbach _____ 73—73

FOREIGN PATENTS 904,639   2/1954   Germany.

ROBERT E. BAGWILL, Primary Examiner

U.S. Cl. X.R.

73—73